(12) United States Patent
Olofsson et al.

(10) Patent No.: US 8,897,783 B2
(45) Date of Patent: *Nov. 25, 2014

(54) METHOD FOR PROVIDING INFORMATION IN A CELLULAR WIRELESS COMMUNICATION SYSTEM

(71) Applicant: Huawei Technologies Co., Ltd., Shenzhen (CN)

(72) Inventors: Henrik Olofsson, Kista (SE); Peter Legg, Kista (SE); Johan Johansson, Kungsangen (SE); Xuelong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/779,099

(22) Filed: Feb. 27, 2013

(65) Prior Publication Data

US 2013/0183960 A1 Jul. 18, 2013

Related U.S. Application Data

(63) Continuation of application No. 13/453,309, filed on Apr. 23, 2012, now Pat. No. 8,417,246, which is a continuation of application No. PCT/CN2010/075983, filed on Aug. 13, 2010.

(51) Int. Cl.
*H04W 36/00* (2009.01)
*H04W 24/08* (2009.01)

(52) U.S. Cl.
CPC .......... *H04W 36/0066* (2013.01); *H04W 24/08* (2013.01); *H04W 36/0055* (2013.01)
USPC .......................................... 455/436; 455/423

(58) Field of Classification Search
USPC .................................. 455/436, 437, 438, 439
See application file for complete search history.

(56) References Cited

U.S. PATENT DOCUMENTS

2007/0026861 A1  2/2007  Kuhn et al.
2007/0213055 A1  9/2007  Sundberg et al.
(Continued)

FOREIGN PATENT DOCUMENTS

CN           1984463 A    6/2007
CN         101107869 A    1/2008
(Continued)

OTHER PUBLICATIONS

International Search Report and Written Opinion of the International Searching Authority issued in Corresponding PCT Patent Application No. PCT/CN2010/075983, mailed May 26, 2011.

(Continued)

*Primary Examiner* — Tu X Nguyen
(74) *Attorney, Agent, or Firm* — Brinks Gilson & Lione (57) ABSTRACT

The present invention relates to a method for providing information in a cellular wireless communication system, the method comprises: detecting a radio link failure (RLF) for a mobile station while connected to a first cell; re-establishing the connection in a second cell; and providing information about said radio link failure (RLF) only to cells supporting the same radio access technology (RAT) as said first cell and/or a third cell, wherein said third cell is the cell to which said mobile station was connected before said first cell. Furthermore, the invention also relates to a method in a mobile station, a method in a base station, a computer program, a computer program product, a mobile station device and a base station device.

17 Claims, 2 Drawing Sheets (56) References Cited

U.S. PATENT DOCUMENTS

| | | | |
|---|---|---|---|
| 2009/0137265 | A1 | 5/2009 | Flore et al. |
| 2010/0173626 | A1 | 7/2010 | Catovic et al. |
| 2011/0206009 | A1 | 8/2011 | Attar et al. |
| 2012/0157107 | A9 | 6/2012 | Jung et al. |

FOREIGN PATENT DOCUMENTS

| | | | |
|---|---|---|---|
| CN | 101518124 A | | 8/2009 |
| CN | 101617548 A | | 12/2009 |
| EP | 1835780 A2 | | 9/2007 |
| MX | 2009009021 A | | 9/2009 |
| SG | 158891 A1 | | 2/2010 |
| WO | WO 01/54443 A2 | | 7/2001 |
| WO | WO 2009/002914 A3 | | 12/2008 |
| WO | WO 2009/064716 A1 | | 5/2009 |

OTHER PUBLICATIONS

Nokia Siemens Networks, "Enabling MRO in case of Re-Establishment Request in Unprepared eNB" Agenda Item 17.1.2, 3GPP TSG RAN WG3 Meeting #68. Montreal, Canada, May 10-14, 2010. R3-101644.

Huawei, "RLF Report at RRC Establishment" Agenda Item 16.1, 3GPP TSG RAN WG3 Meeting #69. Madrid, Spain, Aug. 23-27, 2010. R3-102060.

Huawei, China Unicom, "UE Radio Link Failure" Agenda Item 4.3.1.3, 3GPP TSG-RAN WG2 Meeting #71. Madrid, Spain, Aug. 23-27, 2010. R2-104671.

LTE, "3rd Generation Partnership Project; Technical Specification Group Radio Access Network; Evolved Universal Terrestrial Radio Access (E-UTRA); Radio Resource Control (RRC); Protocol Specification" (Release 10) 3GPP TS 36.331, V10.2.0, Jun. 2011.

LTE, "3rd Generation Partnership Project; Technical Specification Group Radio Access Network; Evolved Universal Terrestrial Radio Access (E-UTRA) and Evolved Universal Terrestrial Radio Access Network (U-TRAN); Overall Description" Stage 2, (Release 10) 3GPP TS 36.300, V10.4.0. Jun. 2011.

LTE, "3rd Generation Partnership Project; Technical Specification Group Radio Access Network; Evolved Universal Terrestrial Radio Access (E-UTRA); Requirements for Support of Radio Resource Management" (Release 10) 3GPP TS 36.133, V10.1.0. Dec. 2010.

Qualcomm, "Performance Measurements for Handover Parameter Optimisation" Agenda Item 6.05.3, 3GPP TSG-SA5 (Telecom Management) Meeting SA5#60.Sophia Antipolis, France, Jul. 7-11, 2008. S5-081092.

Huawei, "Intra-Frequency Handover Measurements" Agenda Item 6.5.3, 3GPP TSG-SA5 (Telecom Management) Meeting SA5#59. Chengdu, China, Apr. 21-25, 2008. S5-080659.

Deutsche Telekom, Nokia Corporation, Nokia Siemens Networks, "Enhancements for RLF Reporting" Agenda Item 4.3.1.1, 3GPP TSG RAN WG2 #70. Montreal, Canada, May 10-14, 2010. R2-102751.

Next Generation Mobile Networks, "NGMN Top OPE Recommendations" Version 1.0, Sep. 21, 2010.

NGMN Alliance, "Handover Optimization" Version 0.4, Feb. 23, 2010.

3rd Generation Partnership Project, "Technical Specification Group Radio Access Network; UTRAN Functions, Examples on Signalling Procedures" (Release 9) 3GPP TR 25.931. V9.0.0, Dec. 2009.

LTE, "3rd Generation Partnership Project; Technical Specification Group Services and System Aspects; Telecommunication Management; Performance Management (PM); Performance Measurements Evolved Universal Terrestrial Radio Access Network (E-UTRAN)" (Release 9) 3GPP TS 32.425. V9.7.0, Jun. 2011.

3rd Generation Partnership Project; Technical Specification Group Services and System Aspects; Telecommunications Management; Self-Optimization OAM; Concepts and Requirements (Release 9) 3GPP TS 32.521. V1.1.0, Jul. 2009.

3rd Generation Partnership Project; Technical Specification Group Services and System Aspects; Telecommunications Management; Self-Optimization OAM; Stage 2 Descriptions (Release 9) 3GPP TS 323.522. V0.2.0, Jul. 2009.

LTE, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description" Stage 2 (Release 9) 3GPP TS 36.300. V9.2.0, Dec. 2009.

LTE, "3rd Generation Partnership Project; Technical Specification Group Radio Access Network; Evolved Universal Terrestrial Radio Access (E-UTRA); Radio Resource Control (RRC); Protocol Specification" (Release 9) 3GPP TS 36.331. V9.3.0, Jun. 2010.

Extended European Search Report issued in corresponding European Patent Application No. 10855784.4, mailed Jun. 12, 2012.

Huawei, "IRAT MRO" Agenda Item 16.1, 3GPP TSG WG3 Meeting #69. Madrid, Spain, Aug. 23-27, 2010. R3-102057.

RAN WG3, "Request to Enable UE-Originated RLF Reports" Self-Organizing Networks (SON), 3GPP TSG-RAN WG3 Meeting #65-bis. Miyazaki, Japan, Oct. 12-15, 2009. Tdoc-R3-092656.

Office Action issued in corresponding European Patent Application No. 10855784.4, mailed May 31, 2013, 4 pages.

Notice of Allowance issued in commonly owned U.S. Appl. No. 13/453,309, mailed Nov. 27, 2012, 11 pages.

Office Action issued in commonly owned U.S. Appl. No. 13/453,309, mailed Oct. 11, 2012, 9 pages.

METHOD FOR PROVIDING INFORMATION IN A CELLULAR WIRELESS COMMUNICATION SYSTEM

CROSS-REFERENCE TO RELATED APPLICATIONS

This application is a continuation of U.S. patent application Ser. No. 13/453,309, filed on Apr. 23, 2012, which is a continuation of International Application No. PCT/CN2010/075983, filed on Aug. 13, 2010, both of which are hereby incorporated by reference in their entireties.

TECHNICAL FIELD

The present invention relates to a method for providing information in a cellular wireless communication system, or more particularly to a method according to the preamble of claim 1. Furthermore, the invention also relates to a method in a mobile station, a method in a base station, a computer program, a computer program product, a mobile station device and a base station device.

BACKGROUND OF THE INVENTION

Normally, a mobile station (MS) in active mode in a cellular wireless communication system is handed over from one cell to the next as it moves through the system, and data can be transmitted and received without significant interruptions due to these handovers.

A handover (HO) procedure can consist of many steps. In many cellular wireless communication systems a HO is: 1) network controlled, i.e. the MS is commanded by the network when to connect to another cell; 2) prepared, i.e. the target cell to which the MS is moving to is prepared; and 3) MS assisted, i.e. the MS provides measurement reports before HO to the serving cell to assist the decision to do HO preparation of target cell(s), and when to leave the serving cell/connect to the target cell.

In the context of HO, the serving cell before HO is often referred to as the source cell. After successful HO the target cell becomes the new serving cell. In Long Term Evolution (LTE) the HO is a "hard handover", which means that the UE radio link is switched from one (source) cell to another (target) cell. In Universal Mobile Telecommunications System (UMTS) hard handovers are used exclusively for Time Division Duplex (TDD) mode, but may also be used for Frequency Division Duplex (FDD) mode.

In the following discourse, the focus is on the intra freq LTE HO procedure, but the procedures are similar for the LTE inter Radio Access Technology (RAT) and LTE inter frequency HO procedures. The intra E-UTRAN in RRC_CONNECTED state is a User Equipment (UE) assisted network controlled HO, with HO preparation signalling in E-UTRAN.

A HO is initially triggered by a measurement report sent from a UE to a serving eNB (E-UTRAN NodeB). The serving eNB configures how the UE shall take measurements, and under what conditions a measurement report shall be triggered and sent to the eNB.

To assist mobility control decisions, the UE can measure several different cells and report the results to the network. Different networks and network deployments can have different detailed behaviour, but in most systems it is natural to trigger HO when signal reception from a target cell is better than from a source cell.

For the case of intra-frequency HO in a reuse-one system (i.e. in a system where the source cell and the target cell uses exactly the same frequency resources) there are strong interference management benefits in (always) keeping the UE connected to the cell with the best signal strength. In the measurement report, the UE includes the reason for the trigger of a HO, e.g. target cell signal stronger than serving cell signal, and measurements of a Reference Signal Received Power (RSRP) or Reference Signal Received Quality (RSRQ) of the serving cell and several neighbour cells including the target cell. To reduce ping-pong effects where a UE is handed over repeatedly between two cells a HO offset is often added to the HO trigger condition: target cell signal should be better than the serving cell signal by an offset, wherein the offset value >0 dB.

When a serving eNB receives a measurement report from a UE and if the eNB wishes to HO the UE to another cell, the eNB performs a HO preparation to that cell. HO preparation involves a signalling exchange between one (serving) eNB and another (target) eNB. The source cell requests the HO (Handover Request) and passes over UE context information; and the target cell decides if it can admit the UE (Call Admission Control) and either accepts or rejects the HO. In an acceptance message (Handover Request Ack), the target cell includes parameters required by the UE to allow it to communicate to the target cell—these parameters being grouped into a transparent container. The source cell may prepare multiple cells for HO.

Following a successful preparation, the HO execution takes place. The source cell issues a HO Command to the UE—this is the RRCConnectionReconfiguration message and carries the transparent container. If, and when, the UE receives this message correctly the UE synchronises to the new target cell and sends a synchronisation message on the Random Access Channel (RACH). The target cell then issues an allocation to the UE so that the UE can send a HO confirmation message to the target cell (RRCConnectionReconfiguration-Complete message).

In the final steps (Handover Completion), which do not involve the UE, the source eNB (serving the source cell) is able to forward data (un-acknowledged downlink packets) to the target eNB (serving the source cell), and the S1-U interface from the Serving Gateway (S-GW) must be switched from the source to the target cell ("path switch"). Finally, if the handover is successful, the target eNB issues a UE Context Release message to the source eNB.

However, it is possible for a HO to fail at different points because of a Radio Link Failure (RLF) or a failure by the RACH. A RACH failure during a HO is called "Handover Failure" in 3GPP TS36.331, but for the remainder of this disclosure the term HO failure is used to comprise both RLF and RACH failures.

After a HO failure, the UE attempts a RRC re-establishment which is described in specifications 3GPP TS36.300 and 3GPP TS36.331. The UE firstly tries to find the strongest cell that it can detect ("cell selection"), and then the UE sends a RRCConnection-ReestablishmentRequest to the cell that it has selected. If this selected cell has prior knowledge of the UE and details regarding the UE connection (e.g. security parameters, this is called the "UE Context") then the cell can send a RRCConnectionReestablishment and the re-establishment will succeed which means that the UE remains in Radio Resource Control (RRC) connected state.

If however the UE context is lacking, the re-establishment request is rejected and the UE drops to RRC idle state, which results in further delay before the UE can transit to RRC connected state and recommence any data communication. The "UE Context" may be passed to a cell during the HO procedure or at some other point in time. This transfer is called HO preparation. Note also that the RRCConnectionReestablishmentRequest carries three fields, the Cell Radio Network Temporary Identifier (C-RNTI) of the UE in the serving cell where failure occurred, the Physical Cell Identity (PCI) of this cell, and the shortMAC-I calculated using the Identity (ID) of the re-establishment cell.

The hard HO in the Universal Mobile Telecommunications System (UMTS) is very similar in many respects to the above description i.e. also being UE assisted but network controlled, which means that the UE is configured to send triggered measurement reports but the network decides when to execute the HO; exploits preparation (using Radio Link Setup procedure); is "backward" HO, which means that the source cell sends the HO command to the UE and the UE replies to the target cell; and is completed by inter-node signalling.

Furthermore, RLF is described in specifications 3GPP TS36.300 and 3GPP TS36.331. One form of RLF is driven by out-of-sync detection by Layer 1. A radio problem detection procedure is started when a UE receives a certain number of consecutive "out-of-sync" indications from lower layers. The number of consecutive indications is specified by the threshold N310. When this happens, the UE starts a timer T310. In case the UE receives a certain (N311) consecutive "in-sync" indications from lower layers while T310 is running, the UE shall stop the timer and return to normal operation.

Following the declaration of a RLF, the UE attempts cell selection. If the UE manages to find a cell to connect to within the cell selection phase, the UE will attempt to re-establish RRC to this cell. If, on the other hand, the UE does not find a cell within the cell selection phase (T311), the UE goes back to idle mode and may start looking for cells on other RATs, examples of which are LTE, UMTS, WiMaX and GSM EDGE Radio Access Network (GERAN).

RLF can also be declared by the Radio Link Control (RLC) layer of the UE when a maximum number of transmissions have been reached for transmission of an uplink RRC signalling packet, but the packet has still not been delivered successfully. Additionally, if the random access during the HO fails (T304 timeout) the UE behaves as if a RLF had occurred. In the present discourse the term RLF relates to any of the above mentioned events.

Moreover, a RLF report was introduced in 3GPP Rel-9 to enable a eNB receiving a RLF report to distinguish between Mobility Robustness Optimisation (MRO) related problems and coverage problems. This was done by including a set of neighbour cell measurements indicating the signal strength at the time of failure. With the help of this, the eNB is able to see if there is an alternative neighbour cell that might have been used, or if there is no neighbour detected in the case of a coverage hole.

The RLF report carries information about:
Serving cell RSRP, and optionally RSRQ;
Neighbours cell RSRP/RSRQ; and
May also indicate the strength of detected inter-RAT neighbour cells.

In Rel-9, if a RLF during a HO is followed by a successful RRC Re-establishment, it is possible to include a RLF Report in a RLF INDICATION message that is sent from a eNB where re-establishment takes place to a eNB that was serving the UE at the point of RLF. The capability of the UE to provide the RLF Report is indicated by a flag in the RCConnectionReestablishmentComplete message. The RLF Report is then provided to the eNB where re-establishment took place using the UE Information procedure.

One remaining problem in Rel-9 is that the UE is only able to send a RLF report if RRC re-establishment is successful. And this is only possible if the cell receiving the RLF report has the context of this UE (it is "prepared" for the HO). In most HO failure cases, the HO is executed too late and the cell where the UE attempts RRC re-establishment is not prepared, so the UE can not send the RLF report.

In order to mitigate this, there have been suggestions to allow the RLF reporting to take place also after the UE has gone back to idle mode. This would mean that the UE reports when attempting RRC establishment.

Furthermore, in 3GPP there has been considerable study into Self-Organising Networks (SON) for LTE. One part of this is the Handover Parameter Optimisation also known as the above mentioned MRO which is aiming at optimising mobility parameters. It has not been specified which HO parameters shall be optimised, but examples include the HO hysteresis (also called offset) and the Time to Trigger (TTT) parameters. The aims of the optimisation are to reduce HO failures whilst at the same time not having more HOs than are necessary. The MRO functionality is distributed in the Evolved-UTRAN (E-UTRAN), i.e. every eNB has its own MRO optimisation function. To assist optimisation, signalling has also been defined between eNBs to help identify HO failure events.

The following is the text describing the use-case of Handover Parameter Optimisation also known as MRO in section 22.5 of specification 3GPP TS36.300, 9.2.0:

One of the functions of Mobility Robustness Optimization [MRO] is to detect RLFs that occur due to Too Early or Too Late Handovers, or Handover to Wrong Cell. This detection mechanism is carried out through the following procedures:

[Too Late HO] If the UE attempts to re-establish the radio link at eNB B after a RLF at eNB A then eNB B may report this RLF event to eNB A by means of the RLF Indication Procedure.

[Too Early HO] eNB B may send a HANDOVER REPORT message indicating a Too Early HO event to eNB A when eNB B receives an RLF Indication from eNB A and if eNB B has sent the UE Context Release message to eNB A related to the completion of an incoming HO for the same UE within the last Tstore_UE_cntxt seconds.

[HO to Wrong Cell] eNB B may send a HANDOVER REPORT message indicating a HO To Wrong Cell event to eNB A when eNB B receives an RLF Indication from eNB C, and if eNB B has sent the UE Context Release message to eNB A related to the completion of an incoming HO for the same UE within the last Tstore_UE_cntxt seconds. The indication may also be sent if eNB B and eNB C are the same and the RLF report is internal to this eNB.

The detection of the above events is enabled by the RLF Indication and Handover Report procedures.

The RLF Indication procedure may be initiated after a UE attempts to re-establish the radio link at eNB B after a RLF at eNB A. The RLF INDICATION message sent from eNB B to eNB A shall contain the following information elements:

Failure Cell ID: PCI of the cell in which the RLF occurred;
Reestablishment Cell ID: ECGI of the cell where RL re-establishment attempt is made;
C-RNTI: C-RNTI of the UE in the cell where RLF occurred.

shortMAC-I (optionally): the 16 least significant bits of the MAC-I calculated using the security configuration of the source cell and the re-establishment cell identity.

eNB B may initiate RLF Indication towards multiple eNBs if they control cells which use the PCI signalled by the UE during the re-establishment procedure. The eNB A selects the UE context that matches the received Failure cell PCI and C-RNTI, and, if available, uses the shortMAC-I to confirm this identification, by calculating the shortMAC-I and comparing it to the received IE.

The Handover Report procedure is used in the case of recently completed handovers, when an RLF occurs in the target cell (in eNB B) shortly after it sent the UE Context Release message to the source eNB A. The HANDOVER REPORT message contains the following information:

Type of detected handover problem (Too Early HO, HO to Wrong Cell)

ECGI of source and target cells in the handover

ECGI of the re-establishment cell (in the case of HO to Wrong Cell)

Handover cause (signalled by the source during handover preparation)

Inter RAT Mobility

HO between different RATs, i.e. inter RAT HO, can have different causes. Two examples could be:

Coverage—the coverage on a current RAT is not sufficient, but there exist coverage on other RATs. Therefore, the UE may be ordered to HO to another RAT;

Capacity—the capacity in the current RAT may not be sufficient, but there exist available capacity in another RAT covering the same area.

For inter RAT mobility based on coverage there is typically two absolute signal strength, or signal quality thresholds: criteria in source RAT and target RAT. The target RAT criterion can be used to set the threshold for which a UE in a LTE system is expected to survive in the target RAT. The source criterion can be used to adjust at what time the UE starts performing inter RAT measurements.

Using a too low criterion for the serving cell leads to excessive measurements and using a too high criterion may lead to dropped calls since the UE is not able to find an alternative before the quality to the serving cell is too poor to use for further communication.

Typical events available for measurement configuration according to specification 3GPP TS36.331 is:

Event A1: Serving becomes better than threshold.
Event A2: Serving becomes worse than threshold.
Event A3: Neighbour becomes offset better than serving.
Event A4: Neighbour becomes better than threshold.
Event A5: Serving becomes worse than threshold1 and neighbour becomes better than threshold2.
Event B 1: inter RAT neighbour becomes better than threshold.
Event B2: Serving becomes worse than threshold1 and inter RAT neighbour becomes better than threshold2.

Here "serving" refers to a serving or source cell, and "neighbour" refers to a detected neighbour cell. The different events compare signal strength (or quality) of cells against fixed thresholds, or the values of serving and neighbour cells are compared (including a hysteresis value as described above).

One typical implementation of an inter RAT HO algorithm (coverage HO) would be as follows:

Inter RAT measurements are started when the quality of the serving cell is below an acceptable level, using event A2.

At that time measurements gaps are configured (if needed) and the UE is configured to report cells from another RAT using event B1 or B2

Inter RAT MRO

An inter RAT MRO functionality in a eNB could adjust the following parameters:

When measurement on the other RAT cells starts (A2) and when report should be triggered (B2_ threshold1);

Requirements on the target cell before reporting (B1 and B2_threshold2);

Setting of different offsets for different frequencies (the offset is set via parameter ofn).

The error cases for inter RAT MRO is slightly different compared to MRO for HOs within LTE (intra-frequency or inter-frequency handover). Different error cases could be, where IRAT denotes inter RAT:

IRAT too late—the threshold requirements for serving cell is set too low, causing the UE to move out of the serving cell before the measurement reports can be started, or the HO can be executed;

IRAT too early—the threshold requirements on the target cell are too low, causing the HO to fail, or an RLF occur shortly after HO;

IRAT wrong RAT—RLF occurring shortly after an HO to another RAT leading to a re-establishment in a third RAT;

IRAT frequent—the requirements on the serving cell is set too strict, casing inter RAT HO even if an intra LTE HO would have been possible;

IRAT ping pong—the requirement on the target cell is too low compared to the requirement on the source cell when the UE has changed RAT;

IRAT rapid HO—Rapid HO to another RAT occurring after HO.

It may be assumed that the "IRAT too late" is the most important failure case, at least initially, since the LTE system may have spotty coverage and will suffer if a HO to legacy systems is not performed in time. The occurrence of "IRAT too late" can be measured by counting the number of times a UE encounter a RLF in the cell, goes back to idle mode and manages to find a new cell in another RAT.

There has been a proposal to extend the existing intra LTE MRO to enable network nodes from different RATs to exchange information (e.g. NGMN Alliance, Handover Optimisation). In the "IRAT too late" example, this would mean that the cell where the UE manages to connect after the RLF will receive a report from the UE with details on the serving cell prior to the failure. This eNB would then need to send a message similar to "RLF indication" to the eNB handling the cell where the UE was connected to before the RLF. It has been discussed that the RAN Information Management (RIM) interface should be used to enable this information transfer between different RATs.

In order to collect and exchange information across RATs, the different RATs have to be able to decode information received from the UE, concerning another RAT and also send this information in a commonly agreed format between the RATs.

Further, the network interface most probable to be used is the RIM. This has been agreed to be used for other purposes for communication between different RATs, with the requirement that the signalling should be limited. The reason for this limitation is the concern about processing complexity for core network nodes. Hence it could be problematic also using this interface for inter RAT MRO.

There is therefore a need for a method for providing information in a cellular wireless communication system mitigating or solving the problems of prior art.

SUMMARY OF THE INVENTION

The object of the present invention is to provide a method which mitigates or solves the problems of prior art. Another object of the invention is to provide a method which improves detection of inter RAT HO problems, reduces signalling, and is compatible with existing cellular communication systems. A yet another object of the invention is to provide an alternative method for providing information in a cellular wireless communication system.

According to one aspect of the invention, the objects are achieved with a method for providing information in a cellular wireless communication system, wherein each cell in said cellular wireless communication system is served by a base station and supports a radio access technology (RAT) for radio communication between a cell and one or more mobile stations connected to said cell; said cellular wireless communication system employing a procedure in which a mobile station may be handed over from a cell to another cell supporting different radio access technologies (RATs), and further employing a procedure in which a mobile station suffering from a radio link failure (RLF), when being connected to a cell, may attempt to re-connect to another cell supporting a different radio access technology (RAT), comprising the steps of:
  detecting a radio link failure (RLF) for a mobile station while connected to a first cell;
  re-establishing the connection in a second cell; and
  providing information about said radio link failure (RLF) only to cells supporting the same radio access technology (RAT) as said first cell and/or a third cell, wherein said third cell is the cell to which said mobile station was connected before said first cell.

Embodiments of the method in a cellular wireless communication system above are disclosed in the dependent claims 2-16.

According to another aspect of the invention, the objects are also achieved with a method in a mobile station for providing information in a cellular wireless communication system, wherein each cell in said cellular wireless communication system is served by a base station and supports a radio access technology (RAT) for radio communication between a cell and one or more mobile stations connected to said cell; said cellular wireless communication system employing a procedure in which a mobile station may be handed over from a cell to another cell supporting different radio access technologies (RATs), and further employing a procedure in which a mobile station suffering from a radio link failure (RLF), when being connected to a cell, may attempt to re-connect to another cell supporting a different radio access technology (RAT), comprising the steps of:
  detecting a radio link failure (RLF) while being connected to a first cell;
  re-establishing the connection in a second cell; and
  providing information about said radio link failure (RLF) only to cells supporting the same radio access technology (RAT) as said first cell and/or a third cell, wherein said third cell is the cell to which said mobile station was connected before said first cell.

According to yet another aspect of the invention, the objects are also achieved with a method in a base station for providing information in a cellular wireless communication system, wherein each cell in said cellular wireless communication system is served by a base station and supports a radio access technology (RAT) for radio communication between a cell and one or more mobile stations connected to said cell; said cellular wireless communication system employing a procedure in which a mobile station may be handed over from a cell to another cell supporting different radio access technologies (RATs), and further employing a procedure in which a mobile station suffering from a radio link failure (RLF), when being connected to a cell, may attempt to re-connect to another cell supporting a different radio access technology (RAT), comprising the steps of
  receiving a radio link failure (RLF) report relating to a radio link failure (RLF) for a mobile station while said mobile station is connected to a first cell; and
  providing information about said radio link failure (RLF) to said first cell and/or to a third cell if said base station supports the same radio access technology (RAT) as said first cell or said third cell, wherein said third cell is the cell to which said mobile station was connected before said first cell.

According to an embodiment of the method in a base station above, said step of providing information involves:
  transmitting said information to a first base station serving said first cell, or to a third base station serving said third cell, directly or via one or more X2 and/or S1 interfaces over one or more other base stations in said cellular wireless communication system.

The method in a mobile station and in a base station above may be modified according to different embodiments of the method in a cellular wireless communication system.

The invention also relates to a computer program and a computer program product when run in a computer causes the computer to execute the method in a mobile station and the method in a base station described above.

According to another aspect of the invention, the objects are also achieved with a mobile station device for providing information in a cellular wireless communication system, wherein each cell in said cellular wireless communication system is arranged to be served by a base station and supports a radio access technology (RAT) for radio communication between a cell and one or more mobile stations connected to said cell; said cellular wireless communication system employing a procedure in which a mobile station may be handed over from a cell to another cell supporting different radio access technologies (RATs), and further employing a procedure in which a mobile station suffering from a radio link failure (RLF), when being connected to a cell, may attempt to re-connect to another cell supporting a different radio access technology (RAT); being configured to:
  detect a radio link failure (RLF) while being connected to a first cell;
  re-establish the connection in a second cell; and
  provide information about said radio link failure (RLF) only to cells supporting the same radio access technology (RAT) as said first cell and/or a third cell, wherein said third cell is the cell to which said mobile station was connected before said first cell.

According to another aspect of the invention, the objects are also achieved with a base station device for providing information in a cellular wireless communication system, wherein each cell in said cellular wireless communication system is arranged to be served by a base station and supports a radio access technology (RAT) for radio communication between a cell and one or more mobile stations connected to said cell; said cellular wireless communication system employing a procedure in which a mobile station may be handed over from a cell to another cell supporting different radio access technologies (RATs), and further employing a procedure in which a mobile station suffering from a radio link failure (RLF), when being connected to a cell, may attempt to re-connect to another cell supporting a different radio access technology (RAT), being configured to:

receive a radio link failure (RLF) report relating to a radio link failure (RLF) for said mobile station while said mobile station is connected to a first cell; and     provide information about said radio link failure (RLF) to said first cell and/or to a third cell if said base station supports the same radio access technology (RAT) as said first cell or said third cell, wherein said third cell is the cell to which said mobile station was connected before said first cell.

The mobile station device and base station device according to the invention may also be arranged according to the different embodiment of the methods above.

By using the present solution, it is possible to support inter-RAT MRO without having to introduce signalling across different RATs and without having to define mechanisms for how a UE shall be able to report the occurrence of a RLF occurring in a different RAT.

The invention further provides the advantages effects of: enabling both detection of inter-RAT RLF problems, e.g. relating to handover problems, and signalling of this knowledge to an original source cell where corrective actions may be taken to avoid the same problem with future inter-RAT handovers; addresses a number of inter-RAT handover failure cases, in particular "IRAT too late", "IRAT too early", "IRAT wrong RAT"; only impacts the LTE signalling functionality of the UE and the eNB; it avoids any signalling from one RAT to another, for example, using the RIM procedure, thereby avoiding additional loading on the core network elements of both RATs; has a smaller impact on the 3GPP standardisation specifications than the prior art solutions; only impacts LTE standardisation specifications; may re-use existing procedures over the X2 interface, such as RLF indication message or Handover report message, with suitable extensions; and is applicable to handovers to non-3GPP RATs, such as WiMax or Wi-Fi.

Other advantages and applications of the present invention will be apparent from the following disclosure.

BRIEF DESCRIPTION OF THE DRAWINGS

The appended drawings are intended to clarify and explain different embodiments of the present invention in which.

DETAILED DESCRIPTION OF EMBODIMENTS OF THE INVENTION

With reference to the discussion above, the present invention provides a method to identify inter-RAT RFL problems, e.g. HO problems, and forward this information to an original source cell.

Therefore, the invention relates to a method for providing information in a cellular wireless communication system, wherein each cell in said cellular wireless communication system is served by a base station (BS), which means that each cell comprises a BS serving that cell. Further, each cell supports a RAT for radio communication between a cell and one or more MSs connected to the cell. The system employs a procedure in which a MS may be handed over from a cell to another cell supporting different RATs. The system further employs a procedure in which a MS suffering from a RLF, when being connected to a cell, may attempt to re-connect to another cell supporting a different radio access technology (RAT) than the RAT supported by said cell.

The method comprises the steps of: detecting a RLF for a MS when the MS is connected to a first cell; re-establishing the broken connection in a second cell; and providing information about the RLF only to cells supporting the same RAT as the first cell and/or a third cell. The third cell is the cell to which the MS was connected before the MS connected to the first cell.

The present invention therefore involves, according to an embodiment, a mechanism in which the MS determines the source cell in case a RLF failure occurs and reports this only to a cell belonging to the same RAT as the source cell belongs to. Thereby, the need for signalling is reduced between different RATs, and further there is no need to translate information between different RATs. Hence, according to an embodiment of the invention, the MS sends a RLF report when returning to the same RAT as the source cell.

According to another embodiment of the invention, the RLF report includes one or more in the group comprising: measurements performed on detected cells in connection with the radio RLF, a cell ID for the first cell, a cell ID for the second cell, a cell ID for the third cell, and a HO failure type. Preferably, the RLF report further includes one or more in the group comprising: a RAT type, a carrier frequency, a location area code, and routing area codes for each cell in the system.

According to yet another embodiment of the invention the step of transmitting involves: transmitting the information via one or more X2 and/or S1 interfaces over one or more other intermediate BS, and preferably the information is contained in a RLF indication message or a in a HO report message if the information is transmitted via one or more X2 interfaces.

The behaviour for MS/MSs and BS/BSs are slightly different depending on the error type, and therefore exemplary scenarios for the different error types will be outlined in the following description. The following description in particular describes LTE RLF in connection with outgoing HO, i.e. from LTE to another RAT, but is not limited to this case which is realised by the skilled person.

However, for LTE systems, the invention only impacts the LTE signalling functionality of the UE and the eNB; and further avoid any signalling from one RAT to another, e.g. by using the RIM procedure, thereby avoiding additional loading on the core network elements of both RATs. The UE must be able to log details of the RLF failure and be able to report these when it finally attaches again to a LTE system. The impact on the 3GPP specifications is therefore lower than the prior art solutions which is advantageous. Furthermore, the present method is also applicable to RLFs or the equivalent in non-3GPP RATs such as WiMax or Wi-Fi.

In the following disclosure exemplary embodiments of the cases: "IRAT too late", "IRAT too early", and "IRAT wrong RAT" are described. However, as realised by the person skilled in the art the invention is not limited to these embodiments, but also relates to and incorporates all embodiments within the scope of the appended independent claims.

Exemplary Embodiment: IRAT too Late

1 A UE is connected to a cell 1, served by eNB 1 supporting RAT1. The UE moves out of coverage for cell 1, detects the radio problems and tries to find a cell that it can connect to. After trying for a certain time, the UE goes to idle mode.

2 When in idle, the UE detects another cell (cell 2) belonging to a different RAT (RAT2) then cell 1. The UE connects to this cell 2 and stays there for some time (see (2) in FIG. 2).

3 Eventually, the UE is moved back to RAT1 to another cell (cell n). This could be cell 1 or a different cell. The UE remembers that it has a stored a RLF report for the source cell in RAT1 that it could send. The UE reports this to the eNB handling cell n on RAT1 (see (3) in FIG. 2).

Figure 1:
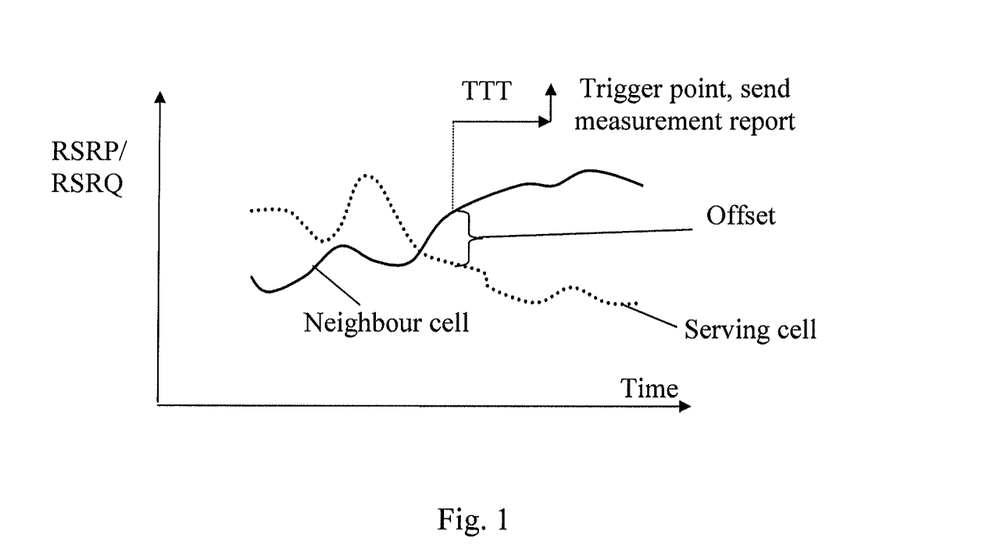
FIG. 1 shows a typical cell scenario with cell measurement.
Figure 2:
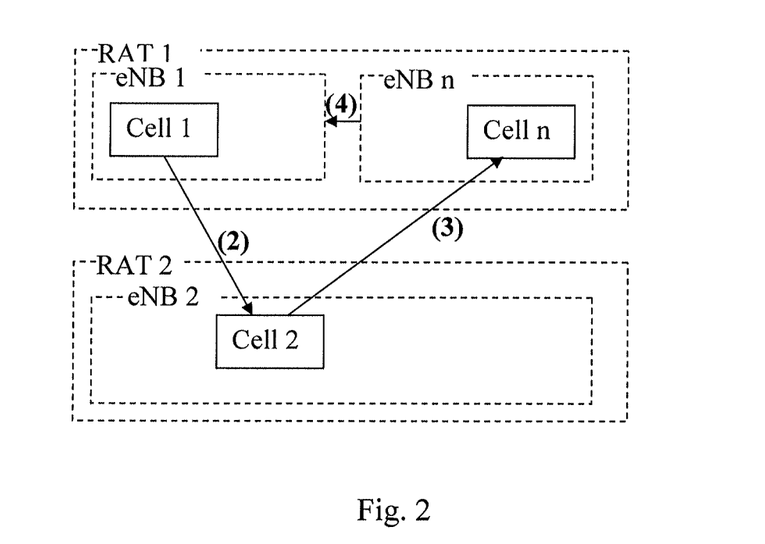
FIG. 2 shows an exemplary embodiment of the invention in the IRAT to early and to late cases.

4 The eNB serving cell n receives the RLF report, reads the report, finds the cell ID (e.g. the EGCI) of the last serving cell (cell 1) and if the cell is different (cell 1 not equal to cell n) forwards the information to the eNB handling cell 1 (see (4) in FIG. 2).

5 The source cell (cell 1) studies the RLF report and uses the information to tune the mobility parameters, such as thresholds for inter RAT mobility events.

Exemplary Embodiment: IRAT too Early

1 A UE is connected to cell 1, which is served by eNB1 supporting RAT1.

2 The UE is handed over to another cell (cell 2) belonging to another RAT (RAT2). Within a short while, defined by a time threshold (T_dwell), the UE detects radio problems and tries to find a cell that it can connect to. After trying for a certain time, the UE goes to idle mode (see (2) in FIG. 2).

3 When in idle mode, the UE detects another cell (cell n) belonging to RAT1. This could be cell 1 or a different cell. The UE connects to this cell, and the UE realizes it has a RLF report for the source cell in RAT1 that it could send. The UE reports this to the eNB serving cell n on RAT1 (see (3) in FIG. 2).

4 The eNB serving cell n receives the RLF report. The eNB reads this RLF report, finds the EGCI of the last serving cell (cell 1) and if the cell is different (cell 1 not equal to cell n) forwards the information to the eNB serving cell 1 (see (4) in FIG. 2).

5 The source cell (cell 1) studies the report and uses the information to tune the mobility parameters.

Exemplary Embodiment: IRAT Wrong RAT

1 A UE is connected to cell 1, served by eNB1 supporting RAT1.

2 The UE is handed over to another cell (cell 2) belonging to another RAT (RAT2). Within a short while, defined by a time threshold (T_dwell), the UE detects radio problems and tries to find a cell that it can connect to. After trying for a certain time, the UE goes to idle mode (see (2) in FIG. 3).

3 When in idle, the UE detects another cell (cell 3) belonging to another RAT (RAT3). The UE connects to this cell (see (3) in FIG. 3).

4 Eventually, the UE is moved back to RAT1 to another cell (cell n). This could be cell 1 or a different cell (see (4) in FIG. 3).

5 The UE remembers that it has stored a RLF report for the source cell in RAT1 that it could send. The UE reports this to the eNB serving cell n on RAT1 (see (5) in FIG. 3).

Figure 3:
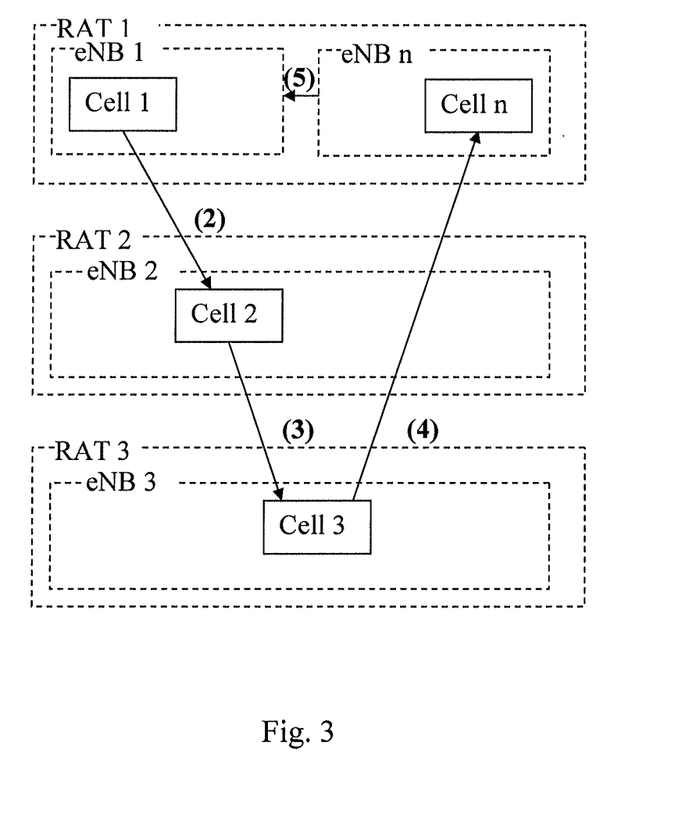
FIG. 3 shows an exemplary embodiment of the invention in the IRAT to wrong RAT case.

6 The eNB serving cell n receives the RLF report. The eNB reads this RLF report, finds the EGCI of the last serving cell (cell 1) and if the cell is different (cell 1 not equal to cell n) forwards the information to the eNB serving cell 1.

7 The source cell (cell 1) studies the RLF report and uses the information to tune the mobility parameters.

UE Behaviour

A UE has to detect and store the following cells in order to determine the error type: the cell to which UE was connected to before the last HO, the cell the UE was connected to before the RLF due to a HO failure, and the cell where the UE reconnects after the RLF.

In the exemplary embodiments illustrated above, unlike the intra LTE MRO, the UE itself indirectly partly identifies the error type by comparing the time between HO and RLF with a threshold (T_dwell) to determine whether the cell in which the RLF occurred should be considered as the source cell (in case of "IRAT too late"), or if the cell prior to the HO should be considered to be the source cell (in case "IRAT too early" or "IRAT wrong RAT"). This is needed, because the UE itself must identify the source cell to enable reporting to the correct RAT. Note that this requires that the threshold T_dwell is transmitted to the UE.

The following cells should be reported by the UE to support inter RAT MRO:

Source cell—The cell supporting RAT1 to which the MS was connected prior to the erroneous event.

Target cell—The cell to which a HO was attempted but where RLF occurs either during HO, of shortly after.

Final cell—The cell where the MS manages to re-establish a connection to the network.

The mapping between the detected cells and the reported cells for the different error cases are listed in Table 1.

TABLE 1

Mapping between detected cells and reported cells

| Stored cell | IRAT too late | IRAT too early | IRAT wrong RAT |
|---|---|---|---|
| The cell a MS was connected to before the last HO | n/a | Source cell | Source cell |
| The cell a MS was connected to before the RLF | Source cell | Target cell | Target cell |
| The cell where a MS reconnects after the RLF | Final cell | Final cell | Final cell |

It should be noted that it may be possible to use other definitions of the reported cells which would result in a different mapping. Further, it may also be possible for the UE to only detect the source cell to know in which RAT to report and report all the detected cells as is [as is?], without any mapping to final/target cell.

It would also be possible for the UE to fully identify the error type and explicitly signal this to the eNB. In order to distinguish between "IRAT too early" or "IRAT wrong RAT" the UE simply needs to compare if the source RAT is the same as the RAT where the UE manages to re-connect after the RLF.

Inter RAT Information Collected and Reported by the UE

In addition to the contents of a RLF report according to prior art for inter RAT measurements, the UE may also according to an embodiment of the invention collect information about detected cells belonging to other RATs. The information should be of relevance for the source cell where the failure occurred, since the information eventually will be transferred to this cell.

The source cell is the cell in RAT1 which the UE was connected to prior to the erroneous event. Since an idea is to report this information to the RAT which the source cell belongs to, the source cell can be uniquely identified by the global Identity (ID) for that RAT, for example by the EGCI in LTE systems.

For the target and final cells, at least one of these will belong to a different RAT (otherwise, the event is not an inter RAT MRO event). It might be sufficient to refer to a certain inter RAT measurement object ID, used by the UE when measuring on other RATs, since this would point to information specific for the neighbour RAT, e.g. carrier frequency. But, as this is configured per UE, and since the report from the UE may not arrive immediately after the failure, it can not always be expected that this information will be kept in the eNB, so it may be more appropriate to store the information in a self decodable way, by explicitly signalling RAT type and carrier frequency in the system.

A similar discussion applies to the cell ID. Since the list of neighbour cells are transferred to the UE, it might be enough to just report the index (to the neighbour cell list) of the cell where the UE manages to reconnect, but since the information may not be kept in the eNB, a cell ID may be explicitly reported in the system according to an embodiment of the invention. Example of information that may be included is:

Carrier frequency E-UTRA Absolute Radio Frequency Channel Number (EARFCN).
RAT type, e.g. UTRAN/GERAN/CDMA2000.
Cell ID.

However, in some cases, the physical cell ID should be enough to identify the target and final cells. One example of this is that the target cell is normally known in the source cell since the source eNB ordered a HO to this cell. One possibility is therefore to only report the physical ID of the target and/or final cells according to another embodiment of the invention.

The final cell may however not be known by the source cell. And the target cell might have been removed from the Neighbour Relations Table (NRT) in the source cell. Therefore, another option is to always use the global ID of the final cell and/or for the target cell.

In case no mapping to target/final cell is performed by the UE (as mentioned as an alternative solution in the previous description) the UE will instead need to report the detected cells, i.e.:

The cell the UE was connected to before the last HO.
The cell the UE was connected to before the RLF.
The cell where the UE reconnects after the RLF.

However, for this situation, the UE can not distinguish between source/target/final cells and will therefore need to report full information for all cells, i.e.:

Carrier frequency EARFCN.
RAT type, e.g. UTRAN/GERAN/CDMA2000.
Cell ID.

As an additional improvement, the information can also be extended to minimize the need for UE Automatic Neighbour Relation (ANR) measurements. In that case, the information collected for target and final cells should always consist of CGI and the Routing Area Code (RAC) of the detected neighbour cell in case of GERAN detected cells, CGI, LAC and, RAC in case of UTRAN detected cells and CGI in case of CDMA2000 detected cells.

Yet another possibility is to use the information available in the Measurement Object definition (as defined in 3GPP specification TS36.331) to decide whether to report the above mentioned ANR related measurements. In LTE, there is a list of cells for which to report CGI (cellForWhichToReportCGI) for UTRAN and GERAN neighbour cells.

Expected Behaviour of eNB Receiving the Information from the UE

It is assumed that there is another solution in place enabling the UE to report the RLF report also after the UE has gone back to idle.

One solution is that the eNB receiving the information from the UE reads the source cell EGCI and in case this cell is handled by a different eNB, forwards the information to the eNB handling the source cell. This forwarding can be accomplished by using the X2 interface and creating a new information element or by adding additional information to either the existing RLF indication message or the RLF report message in LTE systems. The additional information needed is the RAT information for the target and final cell outlined above:

Carrier frequency.
RAT type.
Cell ID.
ANR related info (optional).

Another possibility is to forward the information via the S1 interface.

As an alternative solution, the receiving eNB may also forward the information not only to the eNB serving the source cell but also to the eNB serving the target/final cell, as it may be advantageous for these cells to be aware of the error event.

In case no mapping is performed in the UE (as discussed above), or in case no explicit source cell is signalled in the message from the UE, the eNB itself must perform the error type detection to identify the source cell, using the information reported by the UE. After this is done, the eNB can forward the information to the source cell. In this case, the UE simply collects and reports the information about:

The cell the UE was connected to before the last HO.
The cell the UE was connected to before the RLF.
The cell where the UE reconnects after the RLF.
The time elapsed between the last HO and the RLF.

According to this embodiment the information regarding the cells should contain RAT information (as defined above), and the UE only reports this when managing to reconnect to a cell in the same RAT as it was connected to before the RLF. The eNB receiving this information would then forward it to the eNB serving the cell where the UE was connected before the RLF. This eNB can use the supplied information to determine the error type and perform a similar mapping of detected and reported cells as described above.

If no HO occurred shortly before the RLF, the error type is "IRAT too late" and the cell where the UE was connected to before the RLF is actually the same as the source cell. Therefore, for this specific case, it is possible to directly use the detection of this error case to adjust inter RAT mobility parameters without requiring any additional information transfer.

On the other hand, if a HO occurred a short time instance before the RLF, the error type would be either "IRAT too early" or "IRAT wrong RAT"; and the source cell would be the cell the UE was connected to before the last HO. In that case, information must be passed to the source cell in a message similar to a HO report in intra-LTE MRO. One difference compared to current LTE MRO solution is that this message may need to be sent to another RAT and that the RAT information for all three detected cells must be included. This solution is somewhat less complex for the UE, but still requires new messaging across RAT in order to enable detection of all error cases.

With reference to the above discussed embodiments of a method for providing information in a cellular wireless communication system, the present invention also relates to a method in a MS and in a BS.

The method in a MS comprises the steps of: detecting a RLF while being connected to a first cell; re-establishing the connection in a second cell served by a second BS; and providing information about the RLF only to cells supporting the same RAT as the first cell and/or a third cell, wherein the third cell is the cell to which the MS was connected before the first cell.

The method in a BS comprises the steps of: receiving a RLF report relating to a RLF for a MS while the MS is connected to a first cell; and providing information about the RLF to the first cell and/or to a third cell if the BS supports the same RAT as the first cell or the third cell, wherein the third cell is the cell to which the MS was connected before the first cell.

According to an embodiment of the method above in a BS, the step of providing information involves: transmitting the information to a first BS serving the first cell, or to a third BS serving the third cell, directly or via one or more X2 and/or S1 interfaces over one or more other BSs in the communication system.

The method in a MS and in a BS above may be modified according to different embodiments of the method in a cellular wireless communication system described in above.

Furthermore, as understood by the person skilled in the art, a method in a MS and a method in a BS according to the present invention may be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the invention also relates to a MS device and a BS device. The MS and BS devices may be any suitable devices in any relevant RAT system applicable for the present invention such as LTE, UMTS, CDMA2000, WiMaX, Wi-Fi or GERAN. Hence, the MS may be a UE, MS or SS [SS?] and the BS may be eNB, NodeB or BTS.

The MS device is configured to: detect a RLF while being connected to a first cell;
re-establish the connection in a second cell served by a second BS; and provide information about the RLF only to cells supporting the same RAT as the first cell and/or a third cell, wherein the third cell is the cell to which the MS was connected before the first cell.

The BS device is configured to: receive a RLF report relating to a RLF for a MS while the MS is connected to a first cell; and provide information about said RLF to the first cell and/or to a third cell if the BS supports the same RAT as the first cell or the third cell, wherein the third cell is the cell to which the MS was connected before the first cell.

The MS device and BS device according to the invention may also be arranged according to the different embodiments of any of the methods disclosed.

The invention claimed is:

1. A method for providing information in a cellular wireless communication system, wherein each cell in said cellular wireless communication system is served by a base station and supports a radio access technology (RAT) for radio communication between a cell and one or more mobile stations connected to said cell; said cellular wireless communication system employing a procedure in which a mobile station is allowed to be handed over from a cell to another cell supporting different radio access technologies (RATs), and further employing a procedure in which a mobile station suffering from a radio link failure (RLF), when being connected to a cell, is allowed to attempt to re-connect to another cell supporting a different radio access technology (RAT), characterised by:
  detecting a radio link failure (RLF) for a mobile station while connected to a first cell;
  re-establishing the connection in a second cell; and
  providing information about said radio link failure (RLF) only to cells supporting the same radio access technology (RAT) as said first cell;
  wherein said information comprises a RLF report produced by said mobile station, said RLF report includes a cell identity (ID) for said second cell.

2. The method according to claim 1, wherein said RLF report further includes one or more in the group comprising: measurements performed on detected cells in connection with said radio link failure (RLF), a cell identity (ID) for said first cell, a cell identity (ID) for a third cell, and a handover failure type;
  wherein said third cell is the cell to which said mobile station was connected before said first cell.

3. The method according to claim 1, wherein said RLF report further includes one or more in the group comprising: a radio access technology (RAT) type for each cell included in the RLF report, a carrier frequency for each cell included in the RLF report, a location area code for each cell included in the RLF report, and routing area codes for each cell included in the RLF report.

4. The method according to any of claims 2, wherein said information is transmitted by said mobile station to a fourth base station serving a fourth cell to which said mobile station is connected after said radio link failure (RLF), if said fourth cell supports the same radio access technology (RAT) as said first cell, wherein said fourth cell is any of said first, second or a different cell.

5. The method according to claim 4, further comprising:
  transmitting by said fourth base station said information to a first base station serving said first cells; wherein said transmitting involves:
  transmitting said information via one or more X2 and/or S1 interfaces in said cellular wireless communication system.

6. The method according to claim 5, wherein said information is contained in a radio link failure (RLF) indication message or a in a handover report message if said information is transmitted via said one or more X2 interfaces.

7. Method according to claim 1, wherein a base station serving said first cell uses said information for tuning one or more mobility parameters.

8. A non-transitory computer readable medium with computer executable code stored thereon, which when run in a computer causes said computer to execute said method according to claim 1.

9. A computer program stored on a computer readable medium, comprising in code means, which when run in a computer causes said computer to execute said method according to claim 1.

10. A mobile station device for providing information in a cellular wireless communication system, wherein each cell in said cellular wireless communication system is arranged to be served by a base station and supports a radio access technology (RAT) for radio communication between a cell and one or more mobile stations connected to said cell; said cellular wireless communication system employing a procedure in which a mobile station is allowed to be handed over from a cell to another cell supporting different radio access technologies (RATs), and further employing a procedure in which a mobile station suffering from a radio link failure (RLF), when being connected to a cell, is allowed to attempt to re-connect to another cell supporting a different radio access technology (RAT); characterised in that being configured to:
- detect a radio link failure (RLF) while being connected to a first cell;
- re-establish the connection in a second cell; and
- provide information about said radio link failure (RLF) only to cells supporting the same radio access technology (RAT) as said first cell;
- wherein said information comprises a RLF report produced by said mobile station, said RLF report includes a cell identity (ID) for said second cell.

11. A communication apparatus in a communication device for a cellular wireless communication system, wherein each cell in said cellular wireless communication system is served by a base station and supports a radio access technology (RAT) for radio communication between a cell and one or more mobile stations connected to said cell; said cellular wireless communication system employing a procedure in which a mobile station is allowed to be handed over from a cell to another cell supporting different radio access technologies (RATs), and further employing a procedure in which a mobile station suffering from a radio link failure (RLF), when being connected to a cell, is allowed to attempt to re-connect to another cell supporting a different radio access technology (RAT), the communication apparatus comprising a processor and a memory, the memory embodying instructions executable by the processor to:
- detect a radio link failure (RLF) for the communication device while connected to a first cell;
- re-establish the connection in a second cell; and
- provide information about said radio link failure (RLF) only to cells supporting the same radio access technology (RAT) as said first cell;
- wherein said information comprises a RLF report produced by said mobile station, said RLF report includes a cell identity (ID) for said second cell.

12. A method for providing information in a cellular wireless communication system, wherein each cell in said cellular wireless communication system is served by a base station and supports a radio access technology (RAT) for radio communication between a cell and one or more mobile stations connected to said cell; said cellular wireless communication system employing a procedure in which a mobile station is allowed to be handed over from a cell to another cell supporting different radio access technologies (RATs), and further employing a procedure in which a mobile station suffering from a radio link failure (RLF), when being connected to a cell, is allowed to attempt to re-connect to another cell supporting a different radio access technology (RAT), characterised by:
- detecting a radio link failure (RLF) for a mobile station while connected to a first cell;
- re-establishing the connection in a second cell; and
- providing information about said radio link failure (RLF) only to cells supporting the same radio access technology (RAT) as said first cell;
- wherein said information comprises a RLF report produced by said mobile station, said RLF report includes a RAT type for said second cell and a carrier frequency for said second cell.

13. The method according to claim 12, wherein said RLF report further includes a physical identity (ID) for said second cell.

14. A mobile station device for providing information in a cellular wireless communication system, wherein each cell in said cellular wireless communication system is arranged to be served by a base station and supports a radio access technology (RAT) for radio communication between a cell and one or more mobile stations connected to said cell; said cellular wireless communication system employing a procedure in which a mobile station is allowed to be handed over from a cell to another cell supporting different radio access technologies (RATs), and further employing a procedure in which a mobile station suffering from a radio link failure (RLF), when being connected to a cell, is allowed to attempt to re-connect to another cell supporting a different radio access technology (RAT); characterised in that being configured to:
- detect a radio link failure (RLF) while being connected to a first cell;
- re-establish the connection in a second cell; and
- provide information about said radio link failure (RLF) only to cells supporting the same radio access technology (RAT) as said first cell;
- wherein said information comprises a RLF report produced by said mobile station, said RLF report includes a RAT type for said second cell and a carrier frequency for said second cell.

15. The mobile station device according to claim 14, wherein said RLF report further includes a physical identity (ID) for said second cell.

16. A communication apparatus in a communication device for a cellular wireless communication system, wherein each cell in said cellular wireless communication system is served by a base station and supports a radio access technology (RAT) for radio communication between a cell and one or more mobile stations connected to said cell; said cellular wireless communication system employing a procedure in which a mobile station is allowed to be handed over from a cell to another cell supporting different radio access technologies (RATs), and further employing a procedure in which a mobile station suffering from a radio link failure (RLF), when being connected to a cell, is allowed to attempt to re-connect to another cell supporting a different radio access technology (RAT), the communication apparatus comprising a processor and a memory, the memory embodying instructions executable by the processor to:
- detect a radio link failure (RLF) for the communication device while connected to a first cell;
- re-establish the connection in a second cell; and
- provide information about said radio link failure (RLF) only to cells supporting the same radio access technology (RAT) as said first cell;
- wherein said information comprises a RLF report produced by said mobile station, said RLF report includes a RAT type for said second cell and a carrier frequency for said second cell.

17. The communication apparatus according to claim 16, wherein said RLF report further includes a physical identity (ID) for said second cell.

* * * * *